H. F. PRICE.
BILL PAYMENT FORM.
APPLICATION FILED MAY 31, 1916.

1,240,255.

Patented Sept. 18, 1917.
2 SHEETS—SHEET 1.

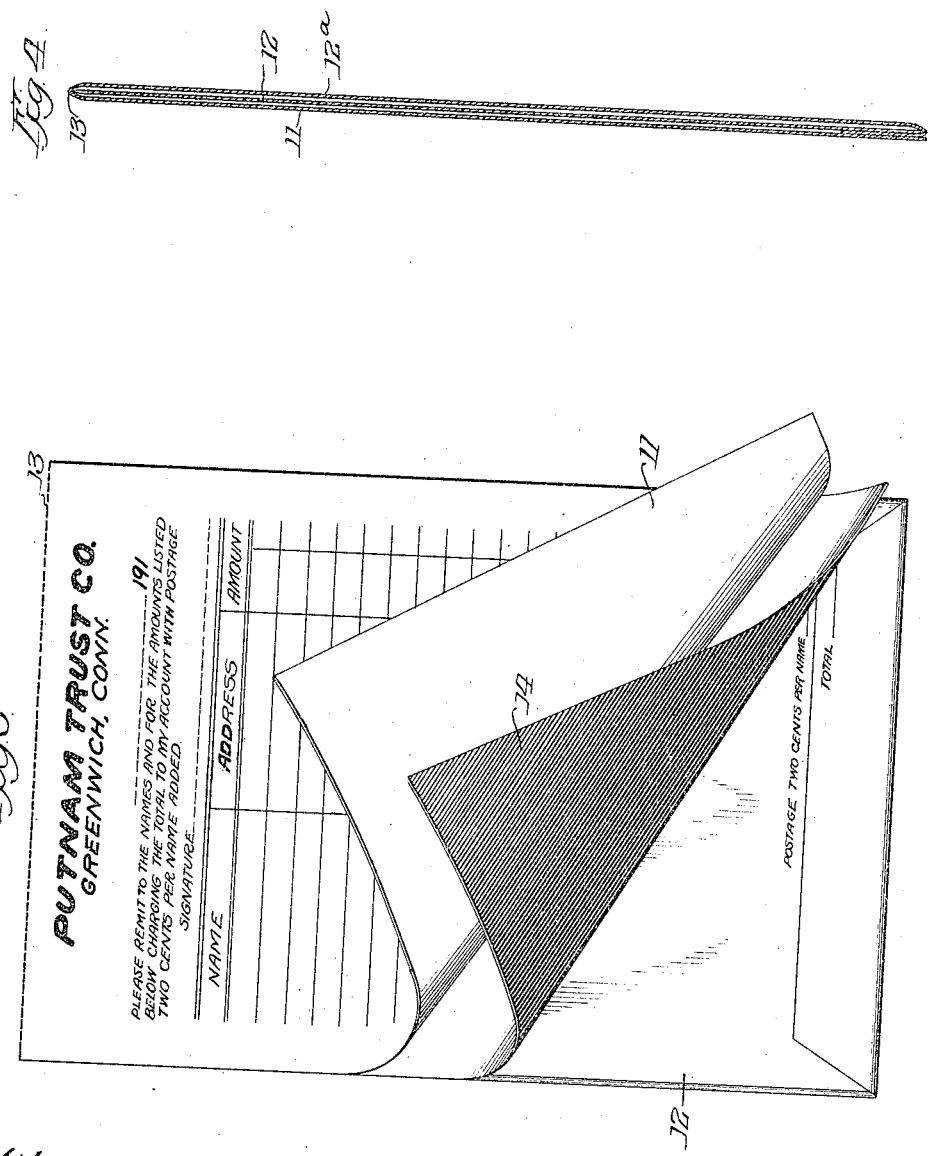

UNITED STATES PATENT OFFICE.

HENRY F. PRICE, OF RIVERSIDE, CONNECTICUT, ASSIGNOR, BY MESNE ASSIGNMENTS, TO THE BUDGET CHEQUE CORPORATION, OF CHICAGO, ILLINOIS, A CORPORATION OF ILLINOIS.

BILL-PAYMENT FORM.

1,240,255.  Specification of Letters Patent.  Patented Sept. 18, 1917.

Application filed May 31, 1916. Serial No. 100,766.

*To all whom it may concern:*

Be it known that I, HENRY F. PRICE, a citizen of the United States, residing at Riverside, in the county of Fairfield and State of Connecticut, have invented certain new and useful Improvements in Bill-Payment Forms, of which the following is a specification.

My invention relates to improvements in the art of banking and has particular reference to novel means for disbursing money in favor of a plurality of persons or accounts.

It has become common practice for individuals and corporations to receive material or supplies on credit, payment therefor being made at regular intervals, say once each month. At that time it becomes necessary to disburse a relatively large sum of money by means of checks, vouchers or drafts, each of these devices used for the payment of money requiring the expenditure of considerable time with the chance of error due to the large number thereof.

It is also true that particularly in small communities many or all of the individuals or firms interested in the transactions referred to have accounts at the same bank. An object therefore in the present invention is to reduce the labor and expense of disbursing moneys by consolidating the accounts and giving to the bank or depository a bill payment check for the aggregate sum with instructions to the depository to distribute the same by crediting certain designated sums to the accounts of certain designated firms or individuals.

It will be understood, of course, that even though the designated payees may not have an account at the depository, the said payees may be duly notified by the bank that upon demand they will receive cash or exchange for the amount designated to be paid to said payees.

My invention contemplates in effect the provision of a device in the form of a check addressed to and acting as an order on a depository to make designated payments to the order of a plurality of payees in settlement of collective accounts such as current periodic bills.

A further feature of the invention is the utilization of a carbon duplicate of the written portion of the check for retention by the drawer in lieu of the usual stub, this carbon imprint appearing on the face of an envelop forming a detachable portion of the check and within which may be preserved the several bills in payment for which the check is drawn, thus providing a receptacle for monthly bills on the face of which is a carbon imprint of the items embraced in the check by which they were paid.

In order that the invention and the manner of its utilization may be readily understood a preferred embodiment of the same is set forth in the accompanying drawings and in the following description based thereon. Obviously the form of the check and the matter imprinted thereon will vary to suit the circumstances of the case and the usage of the bank issuing such form, wherefore it will be understood that the drawing and description are to be taken in an illustrative rather than in an unnecessarily limiting sense. In the drawings—

Figure 1 is a face view of a detached check portion adapted for transmission to the bank;

Fig. 2 is a similar view of the check portion or duplicate adapted for retention by the drawer;

Fig. 3, showing the two check portions assembled with the carbon sheet; and

Fig. 4 is a longitudinal section through the check or other bill payment form.

It will be observed that in the illustration given the bill payment form is in the nature of a bank check and comprises a plurality of sections, the section 11 (shown in Fig. 1) consisting of a plurality of parts, one bearing thereon the name of the bank and containing instructions to the bank to charge a total amount to the account of the drawer and to distribute to a plurality of parties specified individual amounts the sum of which equals the said total amount while another part of the same section comprises spaces for the names of parties to whom disbursements are to be made and for the insertion of the individual amounts to be disbursed to said parties, while the section 12, to be retained by the depositor or drawer comprises space for a duplicate record of the names of said payees and of the individual amounts to be distributed to them, the two sections being separately joined along a weakened or perforated line 13, along which line the section 11 is normally folded over on top of the section 12 in order that the names of the payees and amounts appearing in the space on section 12 may be imprinted by means of a carbon sheet 14 placed between the two sections.

Obviously the number of accounts paid by the one check may be large or small, the print of the check formula addressed to the bank may be varied to suit the choice of the particular bank issuing the check, the inclusion of postage, as shown in the illustration may be waived, and other non-essentials modified within a wide range without departure from or a sacrifice of the advantages characteristic of the invention.

The duplicate check section may contain suitable directional matter as to the filing therein of the bills, such as indicated in the drawings, or obviously the printed matter may be a duplicate of the check form or it may be omitted entirely, the essential feature of the same being the space thereon, corresponding to that on the check and adapted for registry therewith, for an imprint of the names and addresses of the payees and the amounts of the several sums paid, which matter may be written directly thereon or, preferably, imprinted by means of the carbon paper at the time of writing the check.

The check section 12, adapted for retention by the drawer, is preferably made in the form of an envelop with the back cover 12ª, the same being made of a blank suitably folded and marginally secured as indicated in the drawing along the overlapping edges, this envelop serving as a receptacle for the statements or bills settled by means of the check.

In use, the drawer having before him several monthly statements or bills to be settled, takes one of the bill payment forms and placing the carbon sheet 14 in position between the check sections 11 and 12, fills out the check with the names and addresses of his creditors and the respective amounts due them as shown by their individual bills, dating the check and signing the same in the spaces provided. He includes two cents each for postage if such is required by the bank and adds the items to make the total amount of the check. He then detaches the check section 11 along the weakened line 13 and mails it to the bank, placing the bills thus disposed of in the envelop and files it away for future reference. The several bills, their amounts, dates and manner of settlement appearing at a glance on the face of the envelop check section 12 containing the same. The bank, upon receipt of the check section 11, disburses to the parties named the respective amounts and charges the total thereof to the account of the drawer as directed.

I claim:

1. A bank check having thereon a space for the signature of the drawer and comprising a plurality of parts, one part bearing thereon the name of a bank and containing instructions to the bank to charge a total amount to the account of the drawer and to distribute to a plurality of parties specified individual amounts, the sum of which equals said total amount, and another part of said check comprising spaces for the names of said parties to whom amounts are to be distributed, for the insertion of individual amounts to be distributed to said parties, and a third part formed as a receptacle for documents showing the individual accounts to which payments of the said individual amounts may be applied.

2. A bank check having thereon a space for the signature of the drawer and comprising a plurality of sections, one section bearing thereon the name of a bank and containing instructions to the bank to charge a total amount to the account of the drawer, and to distribute to a plurality of parties specified individual amounts, the sum of which equals said total amount, a second section comprising spaces for the names of said parties to whom distributions are to be made and for the insertion of the individual amounts to be distributed to said parties, a third section to be retained by the drawer comprising a receptacle for the bills paid by the said check and spaces for duplicate records of the names of said plurality of parties and of the individual amounts to be distributed to them.

3. A device for use in disbursing to a plurality of parties moneys deposited with a bank, consisting of a plurality of parts, one bearing thereon the name of the bank with instructions to make disbursements from such deposit and having spaces for the signature of the depositor and for the insertion of a total amount equal to the sum of the amounts to be disbursed, another part comprising spaces for the names of parties to whom disbursements are to be made and for the insertion of the individual amounts to be disbursed to said parties, and a third part to be retained by the depositor comprising in combination a receptacle for bills from the said plurality of parties and spaces for records of the names of the plurality of parties and of the individual amounts to be disbursed to them.

4. A device for use in disbursing to a plurality of parties moneys deposited with a bank, consisting in combination of a form comprising spaces for the signature of the depositor, the names of the payees, the individual amounts to be disbursed to said payees, and the total of said individual amounts, and having thereon an order on the said bank to pay the designated individual amounts to the respectively designated payees and to charge the said total amount to the account of said depositor, and of a receptacle adapted to contain bills from the said payees and having spaces for memoranda of the said individual amounts as applied to the said bills.

5. A bill payment form comprising a plurality of separable sections, one section bearing the name of the bank and containing instructions to the bank to remit to specified parties designated amounts aggregating a designated total sum for the account of the drawer and also including spaces for writing in the date, the name of the payees and the amounts, and the signature of the drawer, and another section having spaces for dates, signature and names of payees and amounts as appearing on the first section, the first section adapted for transmission to the bank and the second section being adapted for retention by the drawer and being formed as an envelop receptacle for the bills paid by means of the first section.

6. A bill payment form comprising a plurality of separable sections, one section bearing the name of the bank and containing instructions to the bank to remit to specified parties designated amounts aggregating a designated total sum for the account of the drawer and also including spaces for writing in the date, the name of the payees and the amounts, and the signature of the drawer, and another underlying section having spaces registering with the spaces for date, signature and names of payees and amounts as appearing on the overlying section, and a carbon sheet disposed between the first and second section by means of which to imprint upon the second section the matter written in upon the first section, the first section adapted for transmission to the bank and the second section for retention by the drawer, the second section formed as an envelop receptacle for the bills paid by means of the first section.

In witness whereof I have hereunto signed my name in the presence of two subscribing witnesses numbering and initialing the sheets to which this signature applies.

HENRY F. PRICE.

Witnesses:
 Wm. H. Brettman,
 A. B. Stanton.

Copies of this patent may be obtained for five cents each, by addressing the "Commissioner of Patents, Washington, D. C."